3,252,941
PREPARATION OF UNSATURATED POLYESTERS
James F. Mayer, Hinsdale, and William E. Gerwing, Jr., Dolton, Ill., assignors to Standard Oil Company, Chicago, Ill., a corporation of Indiana
No Drawing. Filed Oct. 28, 1964, Ser. No. 407,207
9 Claims. (Cl. 260—75)

This is a continuation-in-part of application Serial No. 56,093, filed September 15, 1960.

This invention relates to unsaturated polyester resins and particularly to a process of preparing such resins.

In the preparation of unsaturated polyester resins from phthalic anhydride, maleic anhydride, and propylene glycol, there is little problem involved in carrying out the polycondensation (polyesterification-condensation) reaction with all of the reactants present simultaneously in the reaction vessel. This procedure, wherein all reactants are charged simultaneously and reacted simultaneously, is commonly known as the one-stage method.

It has been observed that when isophthalic acid is used in place of phthalic anhydride in the method, the one-stage method of resin preparation is not as effective for producing resins of optimum color and aging properties of the finished plastic materials. A procedure for overcoming a large part of this difficulty has been devised and is disclosed in U.S. Patent No. 2,904,533; this procedure utilizes a two-stage method of preparing the resin. In the first stage, the isophthalic acid, for example, is polycondensed with all of the glycol; the first-stage reaction is continued until essentially a zero acid number product mixture is obtained in the cooking vessel. At this time, the unsaturated acid, such as maleic anhydride, is added to the cooking vessel and the polycondensation reaction continued until the desired acid number final unsaturated polyester resin is obtained. This two-stage method produces resins of better color and better environmental aging properties than is obtainable by the one-stage method. However, a very serious disability is present in this two-stage method over the one-stage method. The two-stage method takes from two to three times the number of hours to complete a resin preparation as does the one-stage method. For many purposes, the economic disabilities imposed by this increased processing time prevents the utilization of these particular unsaturated polyester resins.

It has been discovered that an unsaturated polyester resin can be prepared having the desirable properties of the two-stage method resin prepared by the two-stage method described above and with essentially no penalty—in many cases a saving—with respect to processing time over the one-stage method of preparation. The process of this invention reacts the hereinafter defined benzene dicarboxylic acid and all or substantially all the hereinafter defined dihydric alcohol in a first polycondensation step for a time such that from at least about 55 percent but not exceeding about 90 percent of the water of esterification theoretically producible in the first step is actually produced in and removed from the reaction vessel. Preferably, the amount of water of esterification produced in the first reaction step is about 85–90 percent of the theoretically producible amount from the reaction of the benzene dicarboxylic acid and the dihydric alcohol. At this point, the hereinafter defined unsaturated dicarboxylic acid is added to the reaction vessel containing the reaction product and unreacted materials of the first reaction step and in a second reaction the polycondensation reaction is continued until the resired unsaturated polyester resin product is produced. (If all the dihydric alcohol has not been charged to the first step, the remaining amount is charged to the second step along with the unsaturated acid.) The unsaturated polyester resin product generally has an acid number of not more than about 30 and more usually not more than about 20, and frequently below about 10.

The polycondensation reaction which is involved in the process of this invention is a typical well known reaction. The reaction is particularly well described in Chapter II of "Polyesters and Their Applications," Reinhold Publishing Corporation, 1956.

Another detailed presentation of suitable polycondensation conditions and equipment therefor for use in the two-stage preparation of unsaturated polyesters is given in a brochure of Oronite Chemical Co. entitled, "Processing of Isopolyester Resins," January 15, 1960, the subject matter of which that is pertinent to the instant invention is incorporated by reference herein.

The reactants utilized in the preparation of the unsaturated polyester resins in the process of this invention are benzene dicarboxylic acid, dihydric alcohol, and unsaturated dicarboxylic acid. The benzene dicarboxylic acid may be isophthalic acid itself, terephthalic acid itself, or mixtures of these two. In addition to the defined acids themselves, alkyl substituted isophthalic acid and terephthalic acid may be used. The substituted acids contain one, two, or three alkyl groups and each alkyl group contains 1 to 4 carbon atoms. Illustrative of the substituted acids are methyl isophthalic acid, isopropyl isophthalic acid, t-butyl isophthalic acid, diethyl isophthalic acid, and methyl terephthalic acid.

The unsaturated dicarboxylic acids utilized are alkenedioic acids and anhydrides thereof, which contain 4–8 carbon atoms. Illustrative of these unsaturated dicarboxylic acids are fumaric acid, maleic acid, maleic anhydride, allylmalonic acid, allylmalonic anhydride, isopropylidene malonic acid, isopropylidene malonic anhydride, itaconic acid, itaconic anhydride, citraconc acid, citraconic anhydride, mesaconic acid, glutaconic acid, glutaconic anhydride, dimethylitaconic acid, methylene glutaric acid, allyl succinic acid, trimethyl glutaconic acid, and diethyl maleic acid. Fumaric acid and maleic anhydride are particularly suitable.

The dihydric alcohols utilized are aliphatic alcohols containing only carbon, hydrogen, and oxygen. Particularly suitable are the glycols (alkanediols), the ether glycols (oxyalkanediols) and mixtures thereof. Especially suitable are the alkanediols and oxyalkanediols containing 2–12 carbon atoms. The lower molecular weight compounds containing 2–6 carbon atoms are preferred. Illustrative of these alkanediols and oxyalkanediols are ethylene glycol, propylene glycol, 1,3-butanediol, 1,4-butanediol, neopentyl glycol, 1,6-hexanediol, 1,8-octanediol, 1,10-decanediol, diethylene glycol, triethylene glycol, tetraethylene glycol, dipropylene glycol, tripropylene glycol, and higher molecular weight ethylene glycols and propylene glycols.

The defined benzene dicarboxylic acid and the defined unsaturated dicarboxylic acid are charged to the polycondensation reaction in amounts such that the desired combination of properties of the final resin are obtained. In general, the mole ratio of benzene dicarboxylic acid to the unsaturated dicarboxylic acid is from about 9:1 to 1:9. More usually this mole ratio is from about 4:1 to about 0.5:1 (1:2).

The defined dihydric alcohol is charged to the polycondensation reaction zone in an amount sufficient to react theoretically with all of the carboxyl groups presented therein, i.e., the carboxyl groups contributed by the two acids. Usually more than the theoretical amount of dihydric alcohol is charged. The amount of excess alcohol is determined by the reaction conditions, the particular dicarboxylic acids charged, and the properties desired in the resin product. Usually the amount of dihydric alcohol is not more than about 125 percent of the theoretical. More commonly, the usage of dihydric alcohol is about 105–110 percent of the theoretical.

All of the benzene dicarboxylic acid is charged to the first reaction step. Usually all of the dihydric alcohol is charged to the first reaction step. And both are present simultaneously at the start of the first reaction step. However, it is not necessary that all of the dihydric alcohol be present in the first step, but substantially all of the dihydric alcohol must be present; in general, 75–80 percent of the dihydric alcohol must be charged.

The first reaction step is carried out under typical polycondensation reaction conditions using equipment which permits continuous removal of water of esterification with little or no loss of alcohol. The first step reaction is carried out using agitation to disperse the solid benzene dicarboxylic acid throughout the alcohol which is liquid under these conditions. The first step reaction is carried out until all of the benzene dicarboxylic acid has passed into "solution." In general, this solubilization point is at about 55 percent point, i.e., when the water of esterification produced in the reaction step and removed from the reaction vessel represents 55 percent of that water theoretically producible from the reaction of the benzene dicarboxylic acid and the dihydric alcohol. This point is readily determined by measuring the volume of water recovered from the reaction vessel (adjusting if necessary for loss of dihydric alcohol which will be measured as water) or may be observed visually as the equipment permits. It is desirable to continue the first stage reaction beyond the solubilization point until about not more than about 90 percent of the theoretical water has been produced, and removed in this step. (It has been found that many hours additional time are needed to drive the mixture of polyester, unreacted acid, and unreacted alcohol to substantially zero acid number after this 90 percent point has been reached.) The 90 percent point may, for some particular combination of reactants, be as much as 93 percent. Some leeway is permissible at this point without particularly adverse effect on the total polycondensation reaction time. It is preferred to carry on the first step reaction until the water produced and removed is about 85–90 percent of the theoretical.

When the desired amount of water has been produced from the reaction vessel, the unsaturated dicarboxylic acid is then charged to the reaction vessel containing the mixture of polyester and unreacted acid and alcohol. If all the alcohol has not been charged to the first step, the remainder of the desired amount of alcohol is also charged to the vessel. And then the second step of the total polycondensation reaction is begun. The second step reaction is continued until the polyester resin has the desired acid number which is not more than about 30 and more usually not more than about 20; and also the desired viscosity—or as close to the combination of these two desired characteristics as the particular reaction permits.

With isophthalic acid and the lower molecular weight glycols and ether glycols the first step reaction generally reaches a maximum temperature on the order of 450–470° F. at about the time that the first step reaction is to be terminated. The unsaturated acid (and remaining alcohol) may be added to the reaction vessel at this same temperature. However, very careful control of the temperature in the vessel is needed during the initial stages of the second step reaction. It is easier to control the reaction by lowering the temperature of the contents of the reaction vessel before beginning the second step reaction. It is preferred to lower the temperature of the reaction vessel contents by rapidly adding all of the unsaturated dicarboxylic acid with this latter acid being at ambient temperature. The amount of heat taken up by the unsaturated acid will, in general, drop the temperature of the contents of the reaction vessel to about 350–360° F. If is desirable to have the temperature of the reaction vessel contents somewhat lower than the "initiation temperature" of the particular unsaturated acid charged. For example, fumaric acid and ethylene glycol begin to react vigorously at a temperature of about 380° F. As the reaction proceeds in the second step, the temperature is gradually raised until the final temperature is about 430–450° F.

It is to be understood that the process can be carried out at essentially any of the reaction conditions known by the art for polycondensation involving the defined reactants. Thus, when operating with terephthalic acid, reaction temperatures will be somewhat higher than with isophthalic acid.

The unsaturated polyester resin may be recovered from the reaction zone and utilized as a molding resin. Or the recovered resin may be, in a separate operation, dissolved in ethylenic or allylic monomer such as styrene and utilized for copolymerization, particularly in fiberglass reinforced laminates. The ethylenic or allylic monomer is intended to include styrene itself, alpha methyl styrene, the various methyl styrenes, divinyl benzene, trivinyl benzene, ethyl styrene, and diethyl styrene; or any type of acrylic or methacrylic monomer; or allylic monomer such as diallylphthalate, diallylisophthalate or triallylcyanurate.

In the preparation of the monomer solution, the resin is cooled to a temperature on the order of 200–300° F. as determined by viscosity of the resin and viscosity of the resin solution. Normally polymerization inhibitors such as hydroquinone are added in order to avoid copolymerization during the solution preparation and during storage thereafter.

ILLUSTRATIONS

In the laboratory, comparative resins were prepared using electrically heated vessels provided with a nitrogen gas sparge and a thermometer; a condenser packed with glass beads or the like is connected to the reaction vessel. This condenser is maintained with steam at a temperature such that glycol was refluxed back to the column and water vapor permitted to pass through. Above this partial condenser was mounted a total condenser for condensing the water vapor. The condensate was collected and measured in order to determine the first step termination point.

In all of these comparative illustrations, the reactants were isophthalic acid, 3 moles, fumaric acid, 4 moles; diethylene glycol, 5.6 moles; and ethylene glycol, 1.6 moles.

In the illustration showing the process of this invention, all of the isophthalic acid and all of the glycols were charged to the reactor. The temperature was brought up over a period of one hour to about 460° F. The water recovery rate was followed closely and in Illustration A the termination point of the first step was at 65 percent of the theoretical water producible. In Illustration B, the first step termination point was at 90 percent of the theoretical water producible. At the termination of the first step, all of the fumaric acid was added. The temperature of the reaction mixture dropped to approximately 360° F. This temperature was brought up to about 380° F. and water of esterification was rapidly produced. The temperature was raised to about 445° F. and held at this temperature until the desired viscosity (Z–2 Gardner-Holdt) was obtained at which time the run was terminated. This viscosity is that of a solution consisting of 70% resin and 30% styrene.

Illustration C was carried out using the one-stage method. All of the reactants were placed into the reaction vessel together and the temperature brought up over a period of time to about 450° F. and the temperature held until the desired viscosity (Z–2) was obtained.

Illustration D was carried out in accordance with the two-stage procedure set forth in the "Processing of Isopolyester Resins" brochure. In this two-stage procedure, the isophthalic acid and all of the glycol were charged to the reaction vessel. The temperature was raised to about 450° F. and held until the acid number of the first-step reaction mixture was about 5. Thereafter, following the recommended procedure, the temperature of the first-step reaction mixture was lowered to about 300° F. at which time the fumaric acid was added. The temperature of the mixture was raised to about 445° F. and held until the desired viscosity (Z-2) was obtained.

Laminates were prepared and the flexural strength determined by ASTM-D-790-58T. No. 181 glass cloth finished with vinyl trichlorosilane is cut into pieces of appropriate size (e.g., 10 x 10 inches) and catalyzed styrenated polyester resin is poured onto each layer. Air is allowed to escape. Thorough wetting of the glass fabric is essential. Depending on the viscosity of the resin, it takes 20 to 90 minutes to complete a twelve ply lay-up. The lay-up is placed between sheets of cellophane film and placed in a press at 180° F. Contact pieces or a steel frame of exactly ⅛ of one inch thickness are used so that the ultimate pressure will not actually be carried by the laminate. Slow and gradual closing of press platens is important to allow excess resin solution to flow out. The final weight ratio of glass to polyester resin is approximately 3:2 if the above materials and conditions are used. After 60 minutes press time at 180° F., the laminate is post-cured in an oven for one hour at 180° F.

The flexural strengths were determined on the cured laminate and also on the laminate after it had been immersed in boiling water for 48 hours. Following the ordinary procedures in this art, the ability of the laminate to resist the boiling water test was rated.

The results of the tests for the various polyester resins and the process time for preparing the resins are set out below. The total processing time is the period from first water in receiver in the first step until the final resin was produced.

ILLUSTRATION

|  | A | B | C | D |
|---|---|---|---|---|
| First Step: |  |  |  |  |
| Time, Hr | 1.375 | 2.0 |  | 5.0 |
| Acid No | 106 | 52 |  | 5 |
| Percent Theoretical Water | 65 | 90 |  | 110 |
| Total Time, Hr | 6.5 | 6.8 | 6.8 | 9.5 |
| Final Acid No | 16 | 12 | 24 | 22 |
| Viscosity (Gardner-Holdt) | Z-2 | Z-2 | Z-2 | Z-2 |
| Color (Gardner) | 1 | 1 | 2 | ca. 1 |
| Boiling Water Resistance | Good | Good | Fair | Good |

The above illustrative preparations show that the two-step procedure of this invention produces a resin of equal quality with respect to color and boiling water resistance as does the prior art two-stage operation and does this with a saving of one-third in total processing time while also achieving a lower acid number, which lower acid number is preferred. Also, these illustrative preparations show that the two-step process of this invention produces better colored resins and better quality laminates than does the prior art one-stage method with no increase in total processing time and also achieves the preferred lower acid number.

We claim:

1. The process for preparing an unsaturated polyester resin, having an acid number of not more than 30, which is the polycondensation reaction product of reactants consisting essentially of: (A) a dihydric alcohol of the group consisting of alkanediols, oxyalkanediols and mixtures thereof, (B) a benzene dicarboxylic acid of the group consisting of isophthalic acid, terephthalic acid, alkyl substituted isophthalic acid, alkyl substituted terephthalic acid and mixtures thereof, where each of said alkyl substituted acids contains 1-3 alkyl groups and each alkyl group contains 1-4 carbon atoms, and (C) an unsaturated dicarboxylic acid containing 4-8 carbon atoms of the group consisting of alkenedioic acids and anhydrides thereof, said reactants A and B+C being used in molar amounts that provide a slight excess of hydroxyl groups to carboxyl groups, and a molar ratio of B:C of from 9:1 to 1:9; which comprises conducting in a polycondensation reaction zone the steps of:

(1) charging substantially all of the molar amount of said reactant A and all of the molar amount of said reactant B to said reaction zone to form a first reactive mixture consisting of said reactants A and B in said zone;

(2) reacting said first reactive mixture in said zone under condensation conditions only to the extent that at least about 55% but not exceeding about 90% of the water of the esterification theoretically producible by said reactants A and B is produced and removed from said zone to form a partially esterified reaction mixture;

(3) admixing all of the molar amount of said reactant C and said partially esterified reaction mixture at a temperature below the reaction initiation temperature of said reactant C in said reaction zone to form a second reactive mixture; and (4) thereafter reacting said second reactive mixture in said zone under condensation conditions for a period of time sufficient to produce said unsaturated polyester resin.

2. The process of claim 1 wherein said benzene dicarboxylic acid is isophthalic acid.

3. The process of claim 1 wherein said benzene dicarboxylic acid is terephthalic acid.

4. The process of claim 1 wherein said dihydric alcohol contains 2-12 carbon atoms.

5. The process of claim 1 wherein said dihydric alcohol is propylene glycol.

6. The process of claim 1 wherein said dihydric alcohol is diethylene glycol.

7. The process of claim 1 wherein said unsaturated dicarboxylic acid is maleic anhydride.

8. The process of claim 1 wherein said unsaturated dicarboxylic acid is fumaric acid.

9. The process of claim 1 wherein said benzene dicarboxylic acid is 3 moles of isophthalic acid, said dihydric alcohol is a mixture of 1.6 moles of ethylene glycol and 5.6 moles of diethylene glycol, and said unsaturated dicarboxylic acid is 4 moles of fumaric acid.

References Cited by the Examiner

UNITED STATES PATENTS 2,904,533   9/1959   Carlston _____ 260—75

OTHER REFERENCES

Oronite Isophthalic, pp. 13–17 and 57, bulletin #10, revised April 22, 1955, Oronite Chemical Co.; San Francisco, California (copy in group 140).

WILLIAM H. SHORT, *Primary Examiner.*

LOUISE P. QUAST, *Examiner.*